C. G. BALDWIN.
Lawn Mower Attachment.
No. 228,854. Patented June 15, 1880.
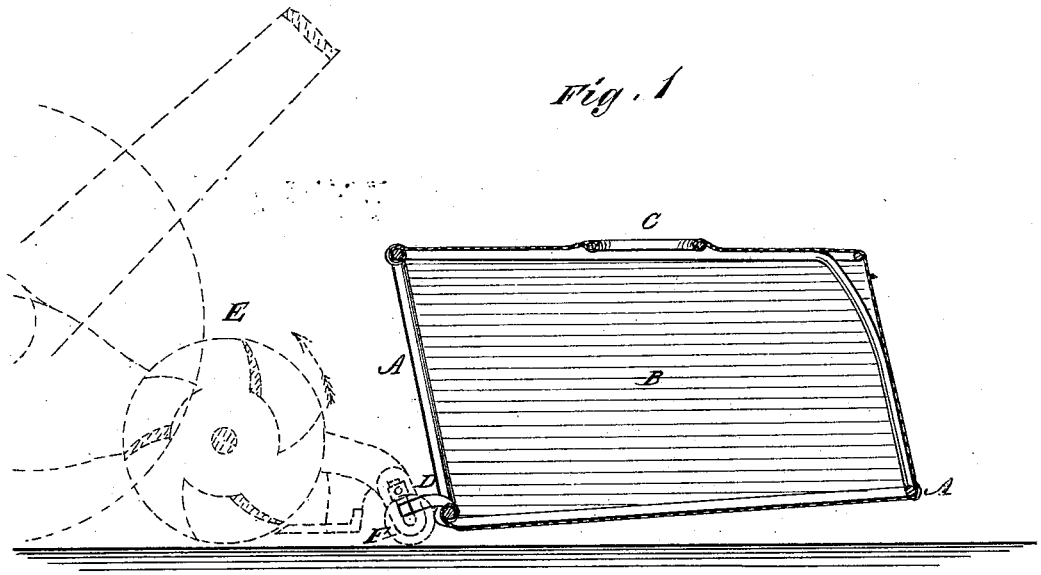
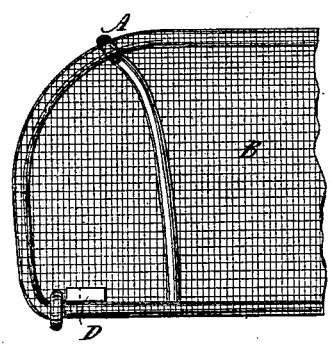
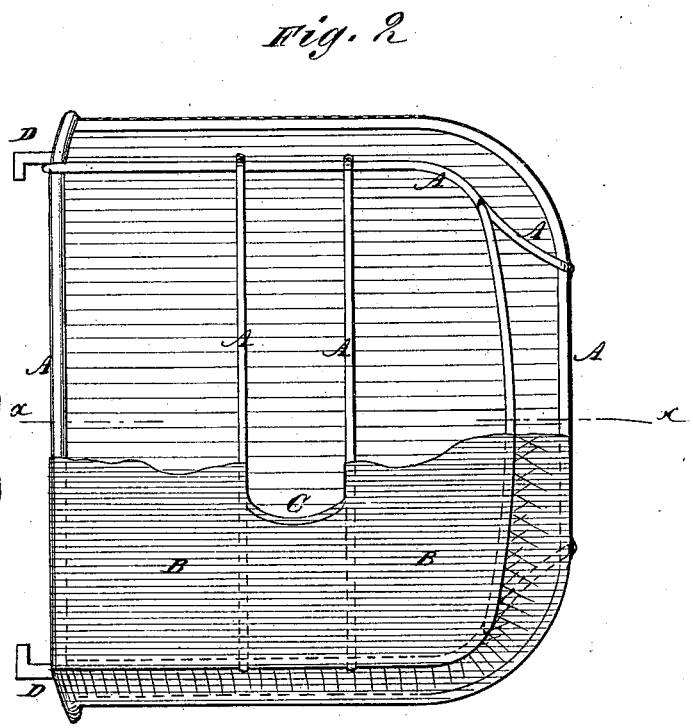
WITNESSES:
C. Neveux
C. Sedgwick
INVENTOR:
C. G. Baldwin
BY Munn &Co
ATTORNEYS.

UNITED STATES PATENT OFFICE.

CYRUS G. BALDWIN, OF RIPON, WISCONSIN.

LAWN-MOWER ATTACHMENT.

SPECIFICATION forming part of Letters Patent No. 228,854, dated June 15, 1880.

Application filed September 1, 1879.

*To all whom it may concern:*

Be it known that I, CYRUS G. BALDWIN, of Ripon, in the county of Fond du Lac and State of Wisconsin, have invented a new and Improved Lawn-Mower Attachment, of which the following is a specification.

Figure 1 is a sectional elevation of the device on line $x\ x$, Fig. 2. Fig. 2 is a plan of the device, partly in section. Fig. 3 is an end elevation of the same.

Similar letters of reference indicate corresponding parts.

The object of this invention is to provide a device to be attached to lawn-mowers for catching and holding the grass as it is cut by the mower.

In the drawings, A represents the wire frame, composed of wires so arranged and fastened together as to give a convenient shape to the device, and B is the covering, of muslin or other light suitable material, drawn over the wire frame A and secured thereto by being stitched about the wires forming the front opening of the device or in some other manner.

C is an opening or man-hole in the top of the device, through which one may reach to push the collected grass backward to make room for more. The grass, as it enters the device, strikes the top between the front and the man-hole, and then falls on the bottom, none of it coming out of the man-hole.

D D are the square hooks, rigidly secured to the lower front wire of the device, and fitting into the slots in the rear of the mower E, (indicated in Fig. 1,) in which the bearings of the small roller F are fastened, so that the device—the "grass-collector," as it may be called—may be held in proper position.

This grass-collector is easily removable, and may be taken off the mower E and emptied of its contents and readily replaced whenever desired, or the grass-clippings may be dumped by tipping the mower forward. It is simple and cheap in construction and light and sufficiently durable, and by its use the clippings of lawns may be saved for food for horses and cattle, these clippings making an excellent food for them when mixed with hay.

Having thus described my invention, I claim as new and desire to secure by Letters Patent—

A grass-catcher having small arms, with a square head adapted to fit the rear slot of a lawn-mower, to be bent down, and to hold the cap up behind and close to the middle of roller, as shown and described.

CYRUS G. BALDWIN.

Witnesses:
  Mrs. LUCY F. KENASTON,
  C. A. KENASTON.